(12) United States Patent
Hog et al.

(10) Patent No.: US 6,802,631 B1
(45) Date of Patent: Oct. 12, 2004

(54) PHOTOSENSITIVE DETECTION UNIT, IN PARTICULAR FOR AUTOMATIC CONNECTION OF LIGHTING EQUIPMENT

(75) Inventors: Norbert Hog, Buehl (DE); Bruno Hodapp, Achern-Oensbach (DE); Rainer Pientka, Renchen (DE); Hans Meier, Ottersweier (DE); Henry Blitzke, Buehl (DE); Manfred Burkart, Iffezheim (DE)

(73) Assignee: Robert Bosch GmbH, Stuttgart (DE)

( * ) Notice: Subject to any disclaimer, the term of this patent is extended or adjusted under 35 U.S.C. 154(b) by 79 days.

(21) Appl. No.: 10/031,163

(22) PCT Filed: Jun. 15, 2000

(86) PCT No.: PCT/DE00/01989

§ 371 (c)(1),
(2), (4) Date: May 31, 2002

(87) PCT Pub. No.: WO01/05625

PCT Pub. Date: Jan. 25, 2001

(30) Foreign Application Priority Data

Jul. 17, 1999 (DE) .......................................... 199 33 642

(51) Int. Cl.[7] ................................................ B60Q 1/00
(52) U.S. Cl. ................ 362/464; 362/802; 250/214 AL; 250/227.25
(58) Field of Search .............................. 362/276, 802, 362/503, 464; 250/227.14, 227.25, 216; 340/601, 604

(56) References Cited

U.S. PATENT DOCUMENTS 4,645,975 A * 2/1987 Meitzler et al. .............. 315/82
5,661,303 A * 8/1997 Teder ....................... 250/341.8
5,990,628 A * 11/1999 Birrell ......................... 315/151
6,376,824 B1 * 4/2002 Michenfelder et al. . 250/214 R
6,507,015 B1 * 1/2003 Maeno et al. .......... 250/227.25

FOREIGN PATENT DOCUMENTS

| DE | 195 23 262 | 1/1997 |
| DE | 197 04 818 | 8/1997 |
| DE | 0 857 611 | 8/1998 |
| DE | 198 39 273 | 9/1999 |

OTHER PUBLICATIONS

"Synthese and characterization of aerosol silicon nanocrystal nonvolatile floating–gate memory device", M.L. Ostraat et al., Applied Physics Letters, vol. 79, No. 3, Jul. 16, 2001, pp. 433–435.

"Ultraclean Two–Stage Aerosol Reactor for Production of Oxide–Passivated Silicon Nanoparticles for Novel Memory Devices", Michele L. Ostraat et al., Journal of The Electrochemical Society; 148 (5), pp. G265–G270.

* cited by examiner

*Primary Examiner*—Alan Cariaso
*Assistant Examiner*—Ali Alavi
(74) *Attorney, Agent, or Firm*—Kenyon & Kenyon

(57) ABSTRACT

A light-sensitive sensor unit, in particular for automatic switching of lighting devices, preferably in motor vehicles, including at least two light-sensitive sensors, at least one first sensor detecting the global lighting conditions, and at least one second sensor detecting the lighting conditions in predetermined directions. All light guide elements provided for the sensors are joined in one piece to form a light guide body.

12 Claims, 2 Drawing Sheets

PHOTOSENSITIVE DETECTION UNIT, IN PARTICULAR FOR AUTOMATIC CONNECTION OF LIGHTING EQUIPMENT

FIELD OF THE INVENTION

The present invention relates to a light-sensitive sensor unit, in particular for automatic switching of lighting devices in vehicles.

BACKGROUND OF THE INFORMATION

Such a sensor unit is known from German Patent No. 195 23 262.3, which includes a global sensor and a directional sensor for detecting the lighting conditions outside the vehicle. The sensor unit is connected to the analyzer unit which determines from the signals of the sensor unit whether a change in the circuit state of the lighting device is necessary under the given lighting conditions prevailing in the surroundings of the vehicle. Although this known sensor unit permits automatic switching of the lighting device, it includes a relatively large number of parts due to the global sensors and the directional sensors, and this means a high cost and expensive adjustment.

SUMMARY OF THE INVENTION

The device according to the present invention has the advantage that a simple, compact, robust, easy-to-assemble and practically adjustment-free sensor unit is available due to the integration of the global and directional sensors. Furthermore, the device includes only a minimal number of components, which permits simple and inexpensive production with expanded functionality. The small dimensions which are possible due to the integration of the global and directional sensors have proven to be another major advantage, because the size of components on the windshields of motor vehicles which interfere with vision should be minimized.

Due to the fact that at least three sensors detect light from predetermined directions, a wider range in front of the vehicle is detected. If at least one sensor is arranged in the direction of travel and the two other sensors are arranged, pivoted out of the direction of travel by an angle a on both sides, this yields a wide cone of detection in front of the vehicle, so that even the entrance of a tunnel which is not yet in the direction of travel can be detected and the lighting devices controlled accordingly.

If the directional sensors have lens-like elements, which may also have a smooth transition between them, the detection cone may be adjusted individually to the wishes of the automobile manufacturer.

Integration of the light guide body of the sensor unit into a light guide body of a rain sensor device makes it possible to eliminate additional components and to further w reduce the number of components on the windshield which interfere with vision, in particular when the light guide body is manufactured in a multicomponent injection molding process together with the light guide body of the rain sensor and the coupling medium.

DETAILED DESCRIPTION

Figure 1:
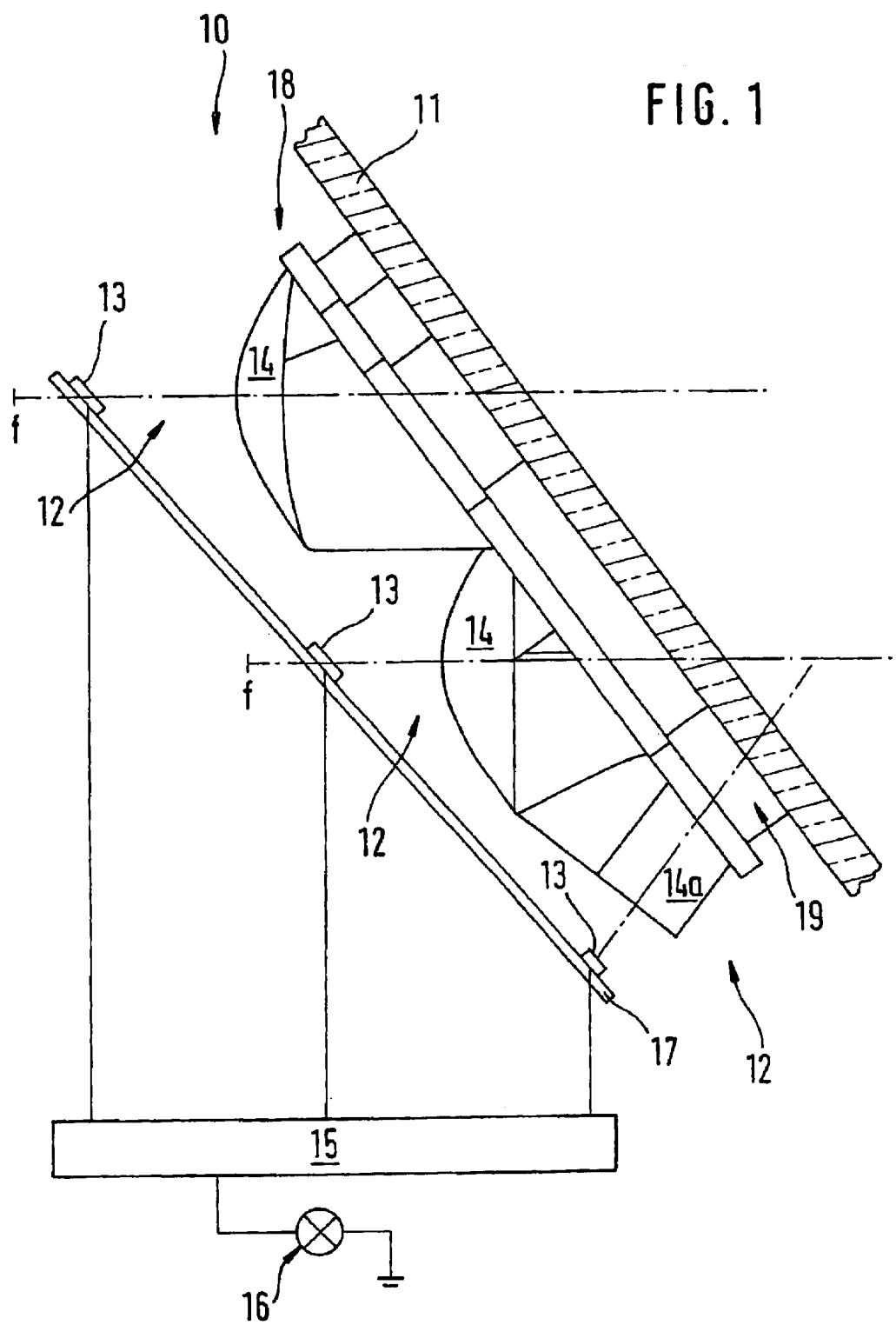
FIG. 1 shows a section through a sensor unit according to the present invention.
Figure 2:
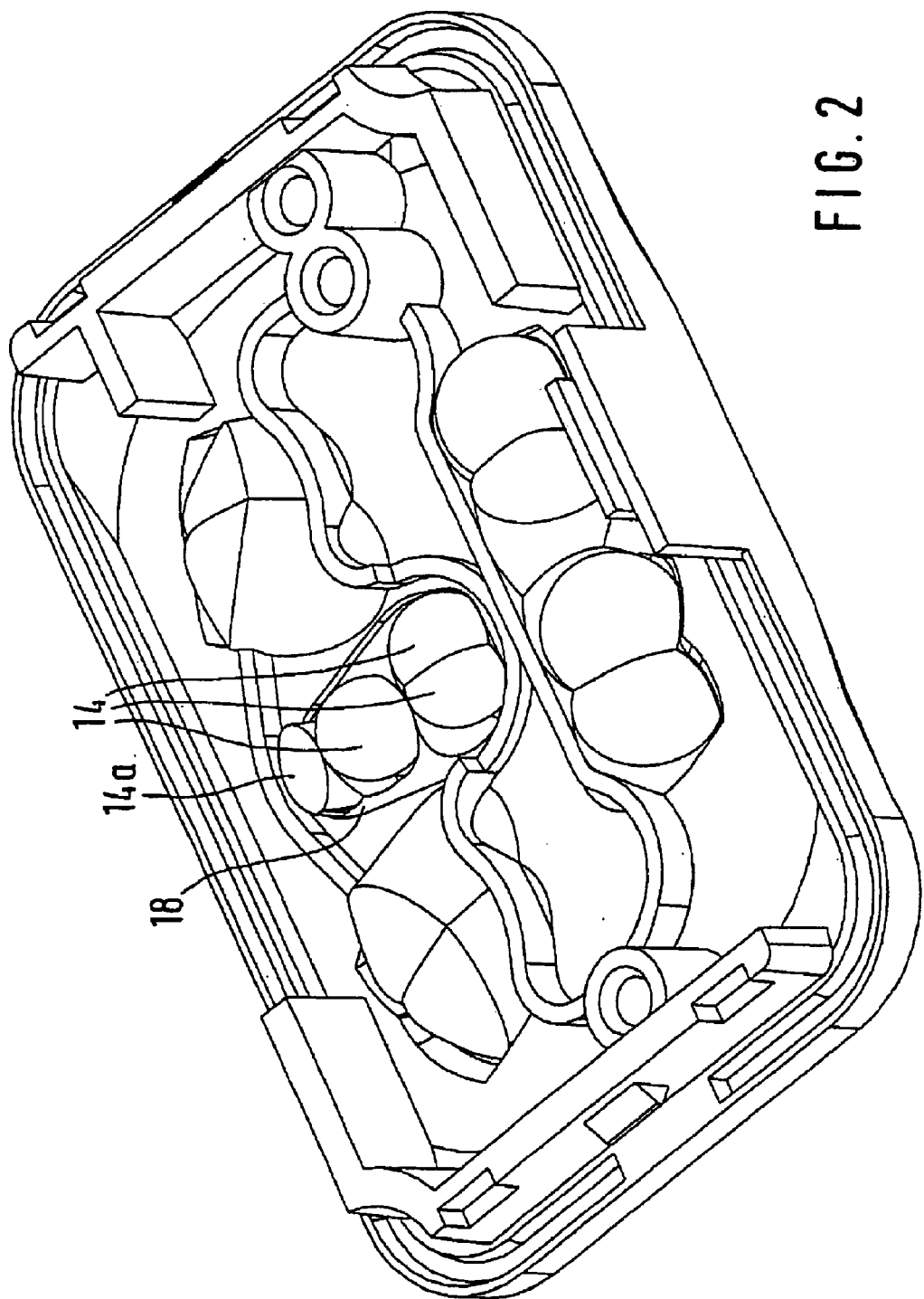
FIG. 2 shows a diagram of the sensor unit integrated into a light guide body of a rain sensor in a perspective view.

FIG. 1 shows a sensor unit 10 according to the present invention, mounted on a windshield 11, in particular a windshield of a motor vehicle. Sensor unit 10 is composed of multiple sensors 12, each sensor 12 including a sensor element 13 and a light guide element 14, 14a. However, two light guide elements 14 here together use one sensor element 13, so that there are three light-sensitive sensor elements 13 having four light guide elements 14 and 14a. The light guide body on which light guide elements 14, 14a are mounted is composed of an at least partially transparent plate having cylindrical recesses sealed with lens-shaped round bodies. These cylindrical recesses together with the lens-shaped round bodies form a light guide element 14, 14a. If parallel light passes through the lens-shaped round bodies along the center axis of the cylindrical recesses, it yields a focal point f which characterizes a focal distance of light guide element 14, 14a.

Sensor elements 13 are each arranged between focal points f of light guide elements 14 and light guide elements 14 themselves. This yields a light detection cone directed forward in the direction of travel, allowing detection in predetermined directions. The cone angle of the light detection cone can be adjusted through the distance between focal points f of respective light guide element 14 and light-sensitive sensor elements 13.

An analyzer unit 15 controls the switching of a lighting device 16 as a function of the signals of sensor elements 13. Sensor elements 13 may be mounted jointly to a circuit board 17 and are preferably designed to permit a differentiation between daylight and artificial light to prevent a shutdown due to artificial lighting in a tunnel, for example. This can be accomplished through a suitable choice of the sensitivity range of sensor elements 13. It is also possible to select the sensitivity range so that certain spectral ranges or characteristic lines, e.g., of gas discharge lamps, are detected, thus permitting control of the high and low beams in a motor vehicle.

In addition to these directional sensors, at least one light guide element 14a is aimed forward but not necessarily in the direction of travel. The light detection cone of this minimum of one light guide element 14a has a very large cone angle and detects global lighting conditions outside the vehicle included, including a translation.

All light guide elements 14, 14a, in particular the sensors of the global sensors and directional sensors, are combined in one piece in a light guide body 18. This light guide body 18 may be manufactured as an injection molded part of transparent or UV-permeable plastic. It is likewise possible to manufacture light guide body 18 of a pigmented or coated plastic which includes an optionally desired filter effect for influencing the sensitivity range of the sensor. This light guide body is pressed onto the windshield over a coupling medium 19, e.g., a silicone pad. Coupling medium 19 prevents air inclusions between windshield 11 and light guide body which would cause unwanted scattering. It is also possible to apply coupling medium 19 directly to light guide body 18 in the manufacture thereof in a multicomponent injection molding process.

What is claimed is:
1. A light-sensitive sensor unit comprising:
   at least two light-sensitive sensors including light guide elements having a predetermined reception characteristic, the at least two sensors including at least one first sensor detecting global lighting conditions and at least one second sensor detecting lighting conditions in predetermined directions, the light guide elements being joined in one piece to form a light guide body.
2. The sensor unit according to claim 1, wherein the sensor unit is for automatic switching of lighting devices in a motor vehicle.

3. The sensor unit according to claim 1, wherein the at least two sensors include at least three sensors detecting light from predetermined directions.

4. The sensor unit according to claim 2, wherein at least one of the sensors is aligned with a predetermined direction in a direction of travel of the vehicle.

5. The sensor unit according to claim 2, wherein at least one of the sensors detects lighting conditions in a predetermined direction and forms an angle with a straight line in a direction of travel of the vehicle.

6. The sensor unit according to claim 2, wherein the at least two sensors include two sensors on each side each enclosing an angle with a straight line pointing in a direction of travel and having a common light-sensitive sensor element.

7. The sensor unit according to claim 1, wherein the light guide elements are joined such that there is a smooth transition between the light guide elements.

8. The sensor unit according to claim 1, wherein the light guide elements include light detection cones that overlap.

9. The sensor unit according to claim 1, wherein the sensor elements distinguish between daylight and artificial light.

10. The sensor unit according to claim 1, further comprising an analyzer unit for distinguishing between daylight and artificial light.

11. The sensor unit according to claim 1, wherein the light guide body is integrated into a light guide body of a rain sensor device.

12. The sensor unit according to claim 11, wherein the light guide body is made in a multicomponent injection molding process, together with the light guide body of the rain sensor device and a coupling medium.

* * * * *

UNITED STATES PATENT AND TRADEMARK OFFICE
CERTIFICATE OF CORRECTION

PATENT NO. : 6,802,631 B1
DATED : October 12, 2004
INVENTOR(S) : Norbert Hog et al.

It is certified that error appears in the above-identified patent and that said Letters Patent is hereby corrected as shown below:

Column 1,
Line 41, change "an angle a" to -- an angle $\alpha$ --

Signed and Sealed this

Ninth Day of August, 2005

JON W. DUDAS
*Director of the United States Patent and Trademark Office*